2 Sheets—Sheet 1.
J. W. COX.
Soft Rubber Cutter.
No. 24,426. Patented June 14, 1859.
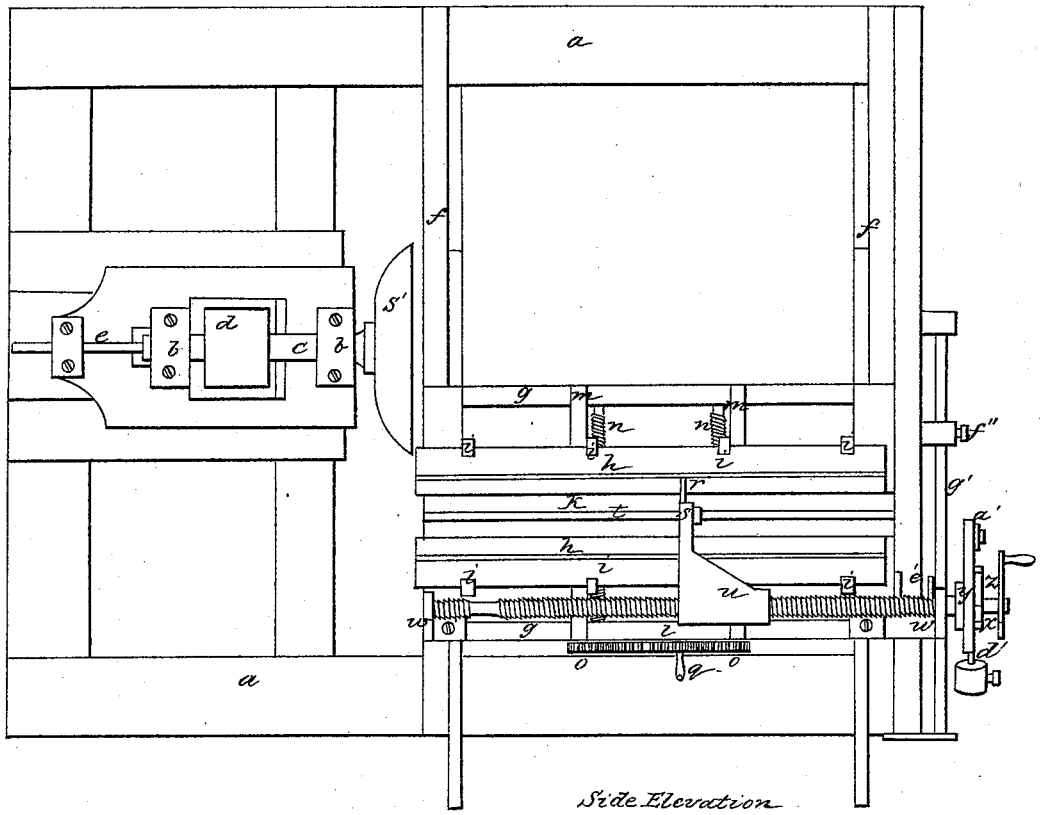
Side Elevation
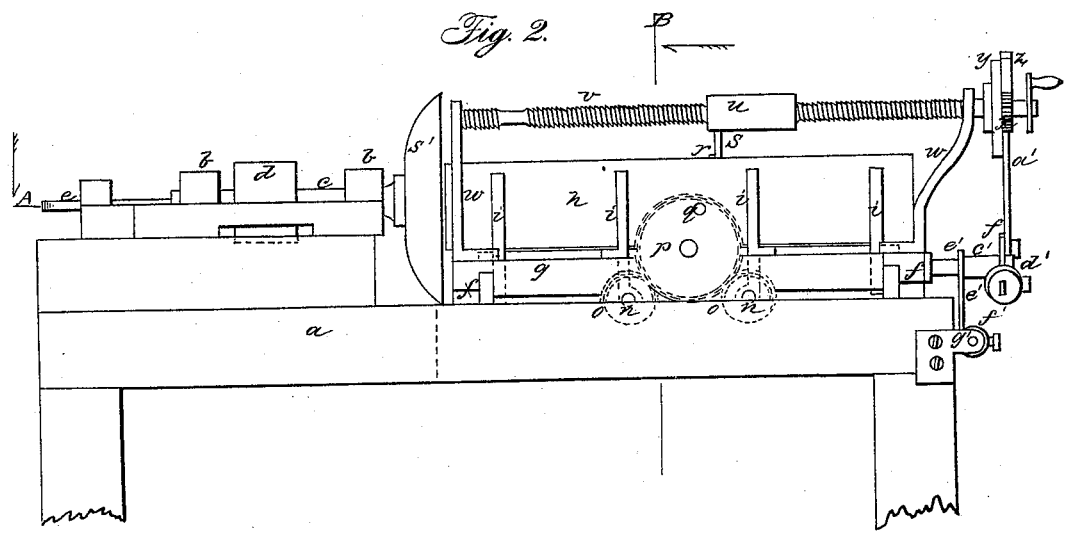
Witnesses:
Inventor:
Joseph W. Cox.

J. W. COX.
Soft Rubber Cutter.
No. 24,426.
2 Sheets—Sheet 2.
Patented June 14, 1859.
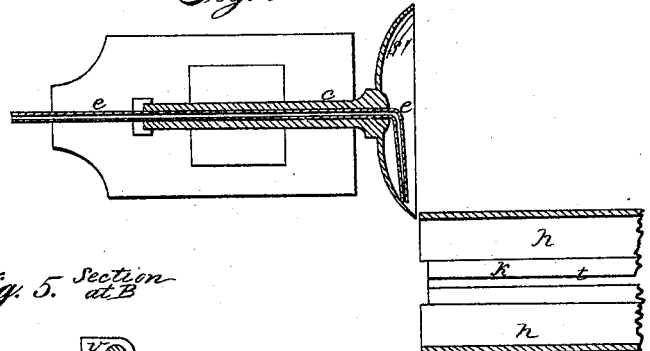
Fig. 4.
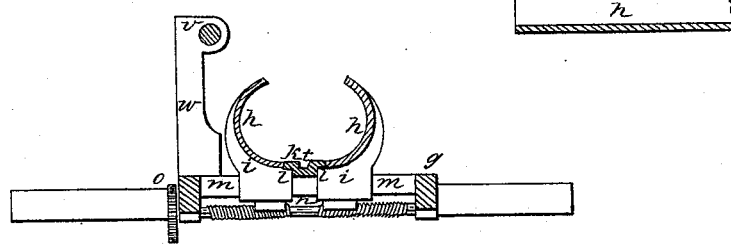
Fig. 5. Section at B.
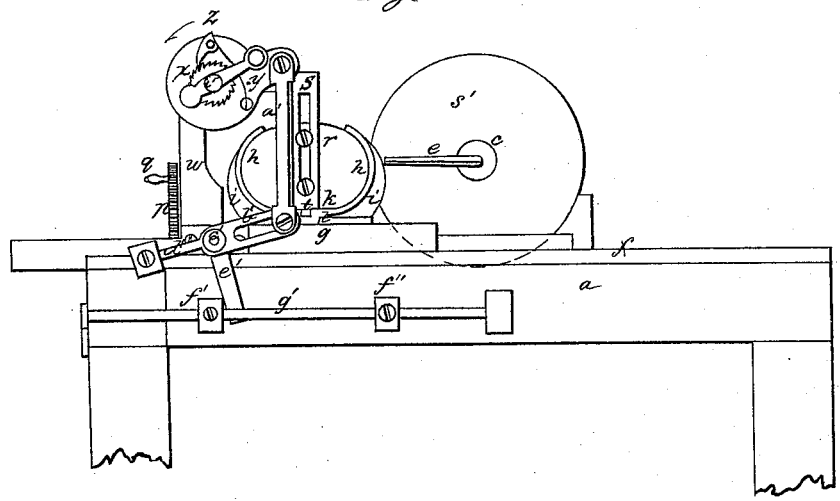
Fig. 3.
Witnesses:
Inventor:
Joseph W. Cox

UNITED STATES PATENT OFFICE.

JOS. W. COX, OF MALDEN, MASSACHUSETTS, ASSIGNOR TO HORACE H. DAY, OF NEW YORK, N. Y.

MACHINE FOR CUTTING INDIA-RUBBER INTO THREADS.

Specification of Letters Patent No. 24,426, dated June 14, 1859.

*To all whom it may concern:*

Be it known that I, JOSEPH W. COX, of Malden, in the State of Massachusetts, have invented certain new and useful Improvements in Machinery for Cutting India-Rubber or other Equivalent Gums into Threads or Narrow Strips or other Forms, and that the following is a description of said improvements, reference being had to the accompanying drawings, making part of this specification, in which—

Figure 1 is a plan, Fig. 2, a side elevation, Fig. 3 an end elevation, Fig. 4 a horizontal section taken at the line A of Fig. 2, and Fig. 5 a cross vertical section taken at the line B of Fig. 2.

The same letters indicate like parts in all the figures.

For many purposes in the arts india rubber and gutta percha or equivalent gums, whether vulcanized or otherwise prepared, are required to be cut into narrow strips, and more particularly into threads for the manufacture of shirred and other elastic fabrics, the quality of which fabrics is in a great measure dependent upon the regularity or evenness of such elastic strips or threads; and the invention of a machine for the production of such threads of uniform thickness from end to end and one with another has long been desired. By my invention I am enabled to produce such elastic threads or strips of perfectly uniform width and thickness and at very little cost, and this I accomplish in the following manner: The india rubber or equivalent, or preparation thereof, whether vulcanized or non-vulcanized and otherwise properly prepared, is first rolled in the usual manner into sheets of uniform thickness, dependent upon the intended thickness of the strips or threads to be produced. The sheet (or sheets) thus produced is rolled up into a roll of the required size dependent upon the capacity of the machine in which the cutting is to be effected, and then such roll is inserted in a concave clamp mounted on a suitable carriage, one end of the roll projecting slightly beyond the front end of the clamp. Within the clamp there is a follower which acts on the rear end of the roll, and which, at the end of each complete operation of the machine, is moved forward and by it the roll to a distance equal to the intended width of the strip or thread to be cut, and then the clamp is closed to hold the roll firmly, while, by a slow and regular lateral movement of the carriage, the roll is presented to the cutting edge of a rapidly rotating disk cutter, mounted on the end of a mandrel or spindle by which it is cut, and as the plane of motion of the cutter is parallel with the lateral motion of the carriage and at right angles to the axis of the roll, a disk, as it were, is cut off from the end of the roll, which produces, when unrolled, a strip or thread of perfectly uniform width, and as the roll from which it is cut, was formed by rolling up a sheet or sheets of uniform thickness, it follows that the strips or threads thus produced must be of perfectly uniform thickness and width from end to end. At the end of each operation the carriage returns to its first position, the clamp is opened to liberate the roll that it may be moved forward the required distance for another cut, the clamp is again closed and the carriage again moved to present the roll to the cutting action of the cutter.

As india rubber and equivalent gums, or mixtures, or preparations thereof, by virtue of their elasticity, when brought in close contact with solid surfaces exclude atmospheric air, attraction of cohesion results. It follows from this that if the face of the disk cutter were in the plane of the cutting edge such face would, during the cutting operation, have to run in contact with the face of the roll produced by the cutting and these surfaces would become highly heated, which would result in injury to both. To avoid this I make the face of the cutter concave or dishing so that the cutting edge alone shall be in contact with the roll. And as it is essential to the practical cutting of these substances that the cutting edge be supplied with water I pass a tube (connected with a suitable hydraulic apparatus) through the mandrel or spindle, made hollow for that purpose, and bend the end of it so as to lie in the concavity of the cutter disk that a stream of water may be discharged against the cutting edge while cutting.

In the accompanying drawings (*a*) represents a suitable frame with puppets (*b b*) in which are mounted a hollow mandrel or spindle (*c*), provided with a pulley (*d*), driven at a high velocity by a belt from some suitable motor, and carrying on its front end a concavo-convex metallic disk (*s'*) the front face being concave, and the concavity extending to or nearly to the edge, which should be made of good steel and sharp. A tube (e), is inserted in the hollow of the mandrel, the front end is bent around so as to lie in the concavity of the disk, and the end is flattened as represented so as to discharge a thin sheet of water against the cutting edge. The rear end of this tube back of the mandrel is to be coupled in any suitable manner with a hose or pipe leading to a head or reservoir of water. Forward of the cutter disk the frame is provided with suitable ways (f f), on which slides a carriage (g), that carries a pair of hollow or concave clamps (h h), each properly secured to bearing pieces (i i). The The concave inner face of these clamps should be of such form as nearly to inclose the roll to be cut, there being a narrow bed like bar (k), on top of the carriage the upper surface of which is a continuation of the curvature of the clamps, and between their lower edges. The roll rests and slides on this bed when not clamped. The under side of this bed-like bar is rabbeted on each side as at (l l), to extend over the lower part of the bearing pieces (i i), to admit of their their moving freely in operating the clamps and yet hold them down. The lower ends of the bearing pieces (i i), are fitted to slide on transverse ways (m), making part of the carriage, and two of them extend down through the carriage and the underface of their lower ends is cut out and threaded to straddle two parallel screws (n n). The shafts of these two screws carry each a pinion (o), both of which engage an intermediate pinion (p), provided with a crank handle (q), by means of which both screw shafts can be turned simultaneously and in the same direction whether to the right or left, and each shaft is threaded with a right and with a left screw, and the two bearing pieces of one clamp engage and are operated by the right handed threads on the two shafts and the bearing pieces of the other clamp engage and are operated by the left handed thread, so that when the crank handle (q), is turned in one direction the two clamps will be drawn toward each other to clamp the roll between them, and when turned in the opposite direction the clamps will be separated to liberate the roll. These operations are to be performed by the attendant whose presence is required to watch the progress of the work; but if desired the skilful mechanician will find no difficulty in applying the requisite mechanism for deriving the required clamping and unclamping movements from the motions of the carriage. The unclamping of the roll is to be done as the carriage is returning after each cutting operation, that the roll may be free to be moved forward toward the end of this return motion of the carriage, the required movement for this purpose being derived from the carriage. And the carriage may be moved alternately in opposite directions by hand or automatically by any of the known mechanisms for a similar purpose not necessary to be described.

For the purpose of insuring the retention of all the convolutions of the roll during the entire operation a disk of gutta percha of the required size is heated, to render it tacky, and in that state applied to the rear end of the roll to which it sticks, and in that condition it is inserted between the clamps while open, and the disk of gutta percha pressed against a follower (r), to which it will slightly adhere, although this is not indispensable. The follower (r), is a disk of metal or other suitable material corresponding in form with and of slightly less diameter than the section of the roll. It is operated by, and attached to the front face of an arm (s), in the manner represented, or in any other suitable manner. The lower end of the arm (s), is fitted to slide in a groove (t), in the upper face of the bed (k), which thus becomes the guide for its movements, and the upper end is provided with a long nut (u), which embraces the thread of a screw shaft (v), by which the follower is operated. The screw shaft is mounted so as to turn in suitable boxes in two standards (w w) of the carriage, that all these parts may move with and make part of the carriage. On one end of the screw shaft there is secured a ratchet wheel (x), and by the side of the ratchet wheel a disk lever (y), that turns freely on the shaft. This disk lever carries a spring pawl or ratchet hand (z), which, when the lever is turned in the direction of the arrow imparts motion to the ratchet wheel and screw shaft the thread of which acting on the nut moves the arm (s), and follower to push the roll forward the required distance. The arm of the ratchet disk (y), is connected by a link (a'), with the slotted arm (b'), of a bent lever that turns on a stud pin (c') on the carriage. This bent lever has a weighted arm (d'), by which the connections of the ratchet are balanced, and it has also another arm (e'), which as the carriage approaches the end of its motion in both directions strikes against stops (f' f'') to impart the required motion. On the back movement it strikes the stop (f') to impart the required motion to push out the roll the required distance for one cut, and at the end of the cutting motion it strikes the stop (f'') to throw back the ratchet hand to its original position preparatory to another operation. These stops are adjustable on a rod (g') attached to the frame that they may be adjusted to the range of motion of the carriage and the range of motion to be given to the follower and roll at each operation is regulated by shifting the point of connection of the link ($a'$), with the slotted arm ($b'$), of the bent lever.

The clamp in its cross section is represented as slightly elliptical, as that is the form which the roll usually assumes; but I do not wish to be limited to any form of clamp, as the form may be varied at pleasure to suit the form of the roll, and although my said invention is mainly intended for cutting strips or threads from sheets rolled up, it will be obvious nevertheless that parts of my said invention are equally applicable to trimming blocks of india rubber, or analogous gums or preparations thereof or cutting disks or slabs of such material.

What I claim as my invention and desire to secure by Letters Patent is—

1. In combination with the concave rotary cutter, substantially as described the employment of a tube placed in the concavity thereof substantially as described for the discharge of a jet of water against the cutting edge as described.

2. I also claim the carriage with its divided clamp and follower, substantially as described, in combination with a rotary cutter, substantially as described or any equivalent cutter, for the purpose set forth.

3. And finally I claim in combination with the carriage clamp and follower, substantially as described, the mechanism or any equivalent thereof, for operating the follower, substantially as described.

JOSEPH W. COX.

Witnesses:
E. G. Thompson,
B. W. Griswold.